United States Patent
Yamaai

(10) Patent No.: US 7,003,159 B2
(45) Date of Patent: Feb. 21, 2006

(54) DOCUMENT FRAME RECOGNITION SYSTEM AND METHOD

(75) Inventor: Toshifumi Yamaai, Yokohama (JP)

(73) Assignee: Ricoh Co., Ltd., Tokyo (JP)

( * ) Notice: Subject to any disclaimer, the term of this patent is extended or adjusted under 35 U.S.C. 154(b) by 806 days.

(21) Appl. No.: 09/904,473

(22) Filed: Jul. 13, 2001

(65) Prior Publication Data

US 2002/0025072 A1 Feb. 28, 2002

(30) Foreign Application Priority Data

Jul. 28, 2000 (JP) .................................... 2000-228083

(51) Int. Cl.
*G06K 9/48* (2006.01)

(52) U.S. Cl. .................... 382/199; 358/453; 358/462; 358/515; 358/538; 382/171; 382/178; 382/194; 382/202; 382/224; 382/275; 382/282; 715/510; 715/520; 715/521

(58) Field of Classification Search ................. 358/515, 358/538, 453, 462; 382/163, 164, 170–171, 382/173–178, 180, 183, 187, 190, 194, 198–199, 382/202–203, 219, 224, 228, 275, 282–283, 382/286, 289; 715/510, 514, 520–521
See application file for complete search history.

(56) References Cited

U.S. PATENT DOCUMENTS

| | | | | |
|---|---|---|---|---|
| 5,119,437 A | * | 6/1992 | Kuwamura et al. | 382/175 |
| 5,502,777 A | * | 3/1996 | Ikemure | 382/173 |
| 5,555,362 A | * | 9/1996 | Yamashita et al. | 715/517 |
| 5,613,016 A | * | 3/1997 | Saitoh | 382/174 |
| 5,706,096 A | * | 1/1998 | Koike | 382/239 |
| 5,896,464 A | * | 4/1999 | Horiuchi et al. | 382/178 |
| 5,898,795 A | * | 4/1999 | Bessho | 382/173 |
| 5,907,631 A | * | 5/1999 | Saitoh | 382/176 |
| 6,141,444 A | * | 10/2000 | Hasegawa | 382/175 |
| 6,289,120 B1 | * | 9/2001 | Yamaai et al. | 382/173 |
| 6,327,387 B1 | * | 12/2001 | Naoi et al. | 382/190 |
| 6,636,631 B1 | * | 10/2003 | Miyazaki et al. | 382/187 |
| 6,754,385 B1 | * | 6/2004 | Katsuyama | 382/171 |
| 6,785,420 B1 | * | 8/2004 | Yamaai | 382/199 |
| 6,798,906 B1 | * | 9/2004 | Kato | 382/176 |

FOREIGN PATENT DOCUMENTS

| | | |
|---|---|---|
| JP | 10-254991 | 9/1998 |
| JP | 11-066225 | 3/1999 |
| JP | 2001-229342 | 8/2001 |
| JP | 2001-236464 | 8/2001 |

* cited by examiner

*Primary Examiner*—Bhavesh M. Mehta
*Assistant Examiner*—Gregory Desire
(74) *Attorney, Agent, or Firm*—Knoble Yoshida & Dunleavy LLC

(57) ABSTRACT

Frames such as boxes or rectangles are recognized in image document data. A first determination process initially screens frames by applying a first set of criteria to select frame candidates. The first set of criteria includes a comparison of a dimension to a predetermined threshold value. A second determination process then further determines whether or not the selected frame candidates are true frames based upon a second set of criteria. For each frame candidate, a pair of a black pixel rectangle and a white pixel rectangle is determined. The second set of criteria includes at least some information on the black pixel rectangle and the white pixel rectangle.

42 Claims, 12 Drawing Sheets

TABLE FORMAT

LADDER FORMAT

INDEPENDENT FORMAT

DOCUMENT FRAME RECOGNITION SYSTEM AND METHOD

FIELD OF THE INVENTION

The current invention is generally related to document recognition, and more particularly related to recognizing frames by a two-step process using a black pixel rectangle and a white pixel rectangle.

BACKGROUND OF THE INVENTION

Prior to optical character recognition (OCR), an OCR unit recognizes frames in document image data that includes frames in certain forms. For example, the OCR unit generally recognizes the frames at their predetermined positions with respect to the document image data. Similarly, a mark recognition unit also relies upon predetermined positional information of the mark which indicates the frames in the document image data. Japanese Laid Patent Publications Heil 1-66225 and Hei9-138837 disclose recognition techniques for determining horizontal and vertical ruled lines based upon a comparison of black pixel runs to a predetermined threshold value and extracting an area enclosed by the four lines as a frame.

Most of the frames recognized in OCR are arranged in two dimensional arrays. FIG. 1 illustrates frames that are arranged in a table format. The frames extend both in the X and Y directions, and at least two of the four sides are touching with those of adjacent frames. FIG. 2 illustrates frames that are arranged in a ladder format. The frames extend only in the X direction, and one or two sides are touching with those of adjacent frames. FIG. 3 illustrates frames that are arranged in an independent format. The frames extend only in the X direction, and no sides are touching with those of adjacent frames. The frames as shown in FIGS. 1 and 2 are defined as complex frames while those as shown in FIG. 3 are defined as simple frames.

In general, complex frames are more readily recognizable by OCR than simple frames. Even though the complex frames are small in size, since the length of ruled lines of each frame is sufficiently longer than the corresponding character size, the above prior art OCR techniques recognize the frames. On the other hand, since simple frames such as check boxes or single-character boxes are generally equal to or smaller than the corresponding character size, it is difficult to recognize these simple frames based upon prior art recognition techniques. In the prior art recognition techniques, the length of continuous black pixels is compared to a predetermined value in order to extract ruled lines. When the predetermined value is lowered in attempt to accommodate smaller frames, the ruled line candidates are erroneously extracted from character regions and the accuracy is undesirably decreased.

Furthermore, the ruled lines used in the above formats are generally thin. When these formats are scanned by a scanner, the ruled lines are sometimes faded. In particular, when the lines that are printed in light color are scanned by a black-and-white scanner, the ruled lines are frequently faded. To compensate the fading, if the scanner is adjusted to read the thin or light ruled lines in the above formats, since input characters tend to be incorrectly scanned, it is useful to set the scanning sensitivity at a high level.

For the above described above reasons, it is desirable to provide a frame recognition technique to recognize at a high precision a single letter frame and a check box that is approximately equal to or smaller than the size of corresponding characters. It is also desirable to provide a frame recognition technique to recognize at a high precision a frame with faded frame lines.

SUMMARY OF THE INVENTION

In order to solve the above and other problems, according to a first aspect of the current invention, a method of recognizing a frame in a document image, including: inputting document image data; extracting a black pixel rectangle that circumscribes continuous black pixels, the black pixel rectangle defining a parent rectangle; determining whether or not the parent rectangle is a frame candidate based upon a predetermined set of first criteria; extracting a white pixel rectangle that circumscribes continuous white pixels within the parent rectangle of the frame candidate; and further determining whether or not the frame candidate is a frame based upon a predetermined set of second criteria, the second criteria including at least a comparison of a certain aspect between the white pixel rectangle and the black pixel rectangle.

According to a second aspect of the current invention, a computer readable medium storing a computer program for recognizing a frame in a document image, the computer program providing computer instructions to perform the following steps of: inputting document image data; extracting a black pixel rectangle that circumscribes continuous black pixels, the black pixel rectangle defining a parent rectangle; determining whether or not the parent rectangle is a frame candidate based upon a predetermined set of first criteria; extracting a white pixel rectangle that circumscribes continuous white pixels within the parent rectangle of the frame candidate; and further determining whether or not the frame candidate is a frame based upon a predetermined set of second criteria, the second criteria including at least a comparison of a certain aspect between the white pixel rectangle and the black pixel rectangle.

According to a third aspect of the current invention, a system for recognizing a frame in a document image, including: an input device for inputting document image data; a black pixel rectangle extraction device connected to the input unit for extracting a black pixel rectangle that circumscribes continuous black pixels, the black pixel rectangle defining a parent rectangle; a first determination device connected to the black pixel rectangle extraction unit for determining whether or not the parent rectangle is a frame candidate based upon a predetermined set of first criteria; a white pixel rectangle extraction device connected to the first determination unit for extracting a white pixel rectangle that circumscribes continuous white pixels within the parent rectangle of the frame candidate; and a second determination device connected to the black pixel rectangle extraction unit and the white pixel rectangle extraction device for further determining whether or not the frame candidate is a frame based upon a predetermined set of second criteria, the second criteria including at least a comparison of a certain aspect between the white pixel rectangle and the black pixel rectangle.

According to the fourth aspect of the current invention, a device for recognizing a frame in a document image, including an input unit for inputting document image data, a black pixel rectangle extraction unit connected to the input unit for extracting a black pixel rectangle that circumscribes continuous black pixels, the black pixel rectangle defining a parent rectangle, a first determination unit connected to the black pixel rectangle extraction unit for determining whether or not the parent rectangle is a frame candidate based upon a predetermined set of first criteria, a white pixel rectangle extraction unit connected to the first determination unit for extracting a white pixel rectangle that circumscribes continuous white pixels within the parent rectangle of the frame candidate, and a second determination unit connected to the black pixel rectangle extraction unit and the white pixel rectangle extraction unit for further determining whether or not the frame candidate is a frame based upon a predetermined set of second criteria, the second criteria including at least a comparison of a certain aspect between the white pixel rectangle and the black pixel rectangle.

According to the fifth aspect of the current invention, an apparatus for recognizing a frame in a document image, including, an input means for inputting document image data, a black pixel rectangle extraction means connected to the input means for extracting a black pixel rectangle that circumscribes continuous black pixels, the black pixel rectangle defining a parent rectangle defining a parent rectangle, a first determination means connected to the black pixel rectangle extraction means for determining whether or not the parent rectangle is a frame candidate based upon a predetermined set of first criteria; a white pixel rectangle extraction means connected to the first determination means for extracting a white pixel rectangle that circumscribes continuous white pixels within the parent rectangle of the frame candidate, and a second determination means connected to the black pixel rectangle extraction means and the white pixel rectangle extraction means for further determining whether or not the frame candidate is a frame based upon a predetermined set of second criteria, the second criteria including at least a comparison of a certain aspect between the white pixel rectangle and the black pixel rectangle.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figures 1, 2, 3:
FIG. 1 illustrates frames that are arranged in a table format.
FIG. 2 illustrates frames that are arranged in a ladder format.
FIG. 3 illustrates frames that are arranged in an independent format.
Figure 4:
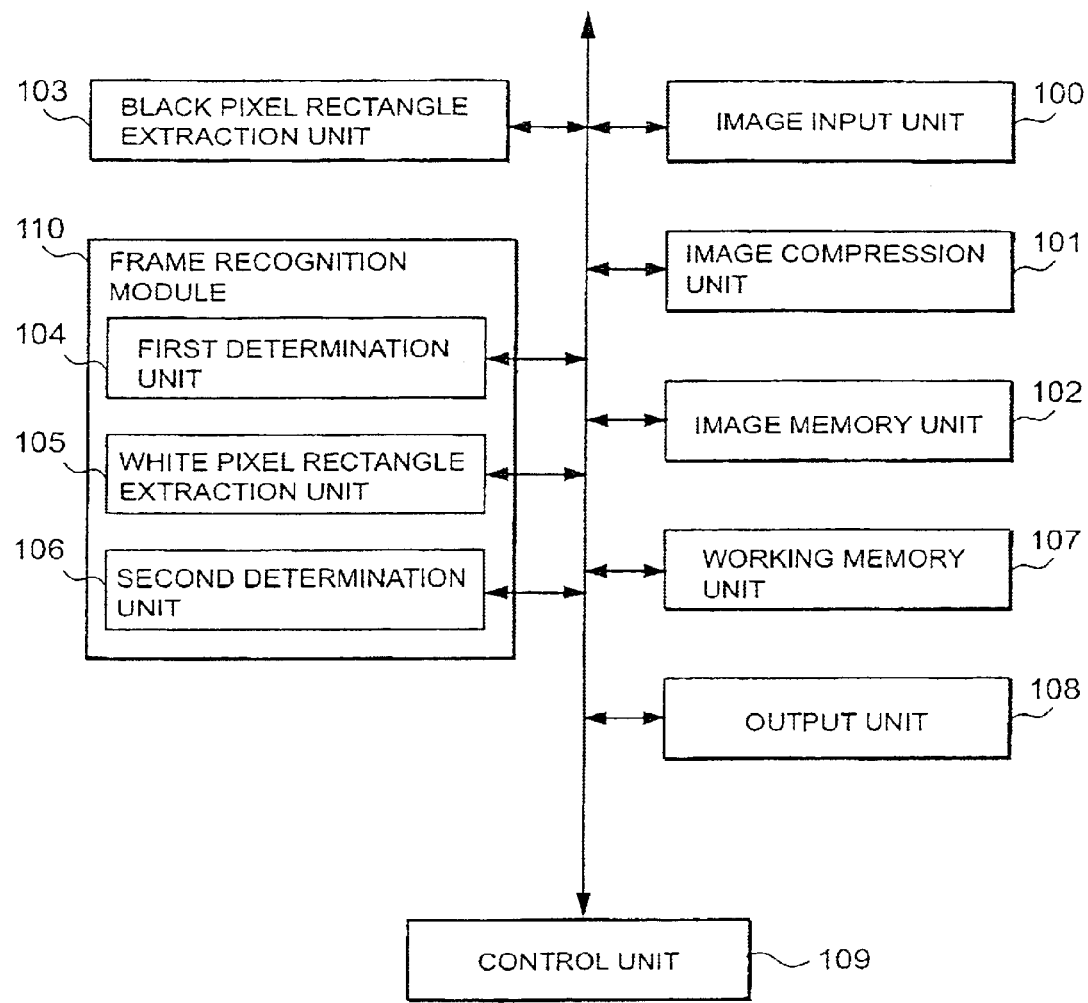
FIG. 4 is a block diagram illustrating one preferred embodiment of the frame recognition device according to the current invention.

Referring now to the drawings, wherein like reference numerals designate corresponding structures throughout the views, and referring in particular to FIG. 4, a block diagram illustrates one preferred embodiment of the frame recognition device according to the current invention. The frame recognition device includes an image input unit 100, an image compression unit 101, an image memory unit 102, a black pixel rectangle extraction unit 103, a working memory unit 107, an output unit 108, a control unit 109 and a frame recognition module 110. The frame recognition module 110 further includes a first determination unit 104, a white pixel rectangle extraction unit 105 and a second determination unit 106. The image compression unit 101 is optionally excluded from the frame recognition device. The black pixel rectangle extraction unit 103 determines a rectangle that circumscribes continuous black pixels and extracts the circumscribing rectangle as a black pixel rectangle. Similarly, the white pixel rectangle extraction unit 105 extracts a white pixel rectangle from an inner area of the parent rectangle, and the white pixel rectangle circumscribes continuous white pixels.

Still referring to FIG. 4, the frame recognition module 110 recognizes at a high precision a single letter frame and a check box that is approximately equal to or smaller than the size of corresponding characters based upon the first determination unit 104, the white pixel rectangle extraction unit 105 and the second determination unit 106. For the recognition of other frames, the frame recognition device optionally includes another prior art frame recognition module and outputs the recognition results in combination with those from the frame recognition module 110. In other words, the current invention is optionally practiced by combining the prior art technology. When a prior art technology is combined, since the following rectangle extraction is substantially common with the prior art technology, a common unit is shared. Although the preferred embodiment of the frame recognition device according to the current invention is a stand-alone device, an alternative embodiment includes a front end processing unit such as an optical character recognition (OCR) unit and or a format definition unit such as an optical mark recognition (OMR) unit for storing a marked frame definition.

Figure 5:
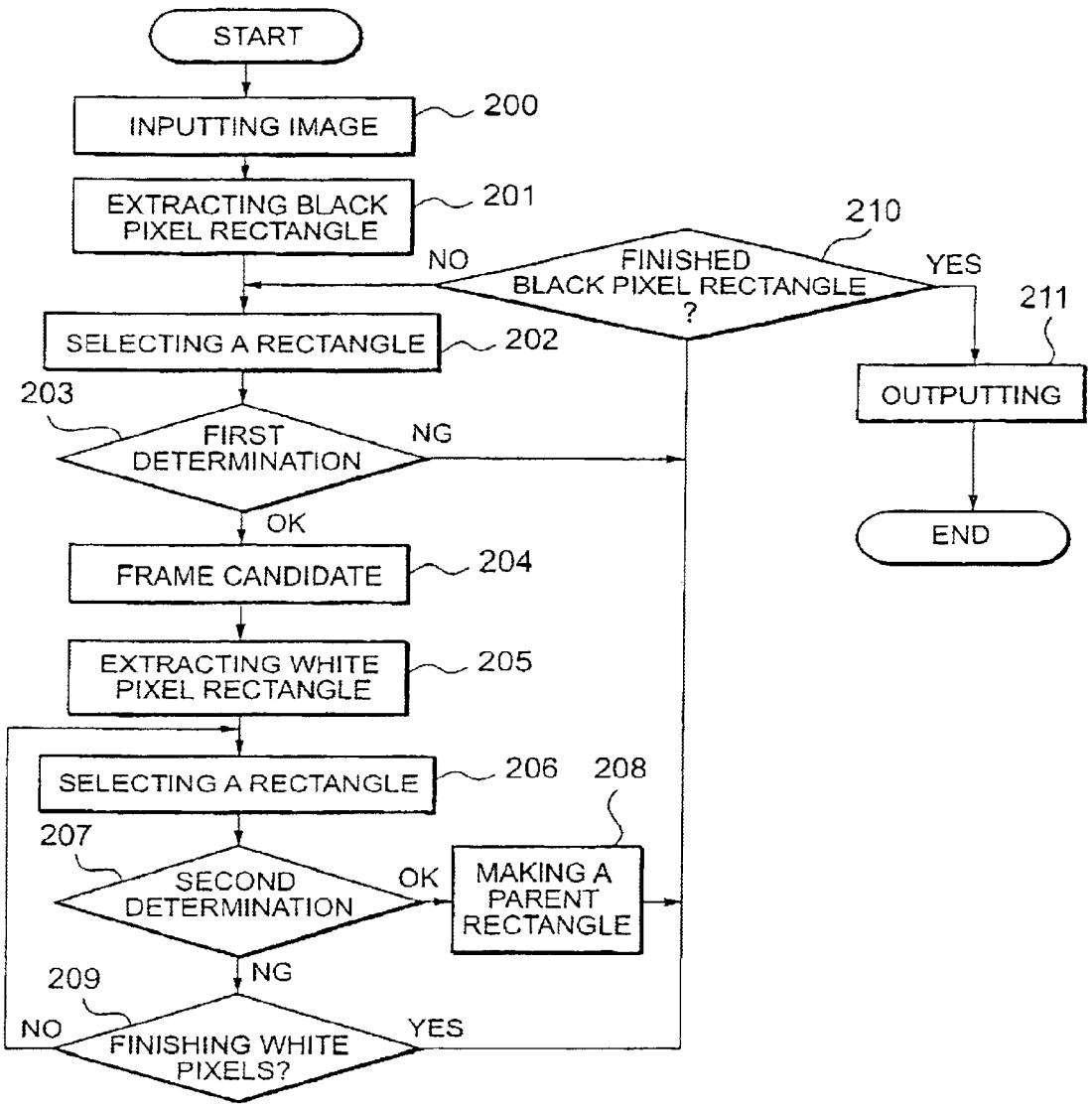
FIG. 5 is a flow chart illustrating overall steps involved in a preferred process for recognizing frames according to the current invention.

Now referring to FIG. 5, a flow chart illustrates overall steps involved in a preferred process for recognizing frames according to the current invention. For example, the following steps are performed by the components of the frame recognition device as shown in FIG. 4. In a step 200, the image input unit 100 inputs document image data generally in a digital format, and the image memory unit 102 stores the document image data. Further in details, the document image data is directly inputted by a document image scanner or a memory storage unit in a personal computer. In the alternative, the document image data is indirectly inputted via a network or from a portable magnetic storage medium. After the document image data is inputted, the image compression unit 101 compresses the data by an OR compression depending upon necessity. The OR compression helps reduce the storage space, the processing time for extracting a black pixel rectangle and an undesirable effect of unclear frame lines. The black pixel rectangle extraction unit 103 extracts a black pixel rectangle from the document image data in the image memory unit 102 in a step 201. The black pixel rectangle extraction is optionally limited to a certain predetermined portion of the document image. The area information for an extracted black pixel rectangle includes coordinates of corners such as an upper left and a lower right, and the area information is stored in the working memory unit 107. As described above, the document image data is in the original format or in the OR compressed format.

Still referring to FIG. 5, after the above process of the black pixel rectangle extraction, the frame recognition module 110 initiates the following steps for the frame recognition process. In a step 202, information on one black pixel rectangle is retrieved from the working memory unit 107. Based upon the retrieved information, the first determination unit 104 determines whether or not the black pixel rectangle is a frame candidate or a non-frame candidate in a step 203. To make the above first determination, although there are numerous criteria such as the height, width, area, the number of black pixels of the black pixel rectangle, the extracted rectangle size is simply compared to the corresponding character size in the step 203. If the extracted rectangle size is approximately the same as or smaller than that of the corresponding text, the extracted rectangle is likely to be determined as a check box or a single-character box.

One exemplary set of criteria for the first determination includes the following four conditions:

1-1) a height or width is larger than a first predetermined value.

1-2) a height or width is smaller than a second predetermined value.

1-3) a ratio of height and width is larger than a third predetermined value.

1-4) a black pixel density is larger than a fourth predetermined value where the black pixel density is a result of dividing a number of black pixels in a black pixel rectangle by the area of the black pixel rectangle. The condition 1-1) excludes black pixel rectangles whose frame size exceeds for the purpose of writing characters inside the rectangles. For example, the first predetermined value is 2 cm. The condition 1-2) excludes extremely small black pixel rectangles from the candidates such as below 3 mm in the document image. The condition 1-3) excludes black pixel rectangles that have a disproportionately high ratio of height and width. The condition 1-4) excludes black pixel rectangles that are substantially filled with black pixels. The 1-4) condition cannot be met unless a single character frame or a check box is darkened. To count a number of black pixels for determining the black density value, the first determination unit 104 counts a number of black pixels by referring to the document image data in the image memory unit 102. Alternatively, the black pixel rectangle extraction unit 103 counts a number of black pixels when a black pixel rectangle is extracted and writes the information in association with the area information in the working memory unit 107. The latter is generally advantageous for the processing efficiency.

In the step 203, the first determination unit 104 outputs a determination result based upon the above four conditions 1-1) through 1-4). When any one of the conditions 1-1) through 1-4) is met, the first determination result becomes NG. The black pixel rectangle in question becomes no longer a frame candidate, and the preferred process proceeds to a step 210. In the step 210, if the black pixel rectangle in question is not a last black pixel rectangle to be examined, the preferred process returns to the step 202 for making a determination on another black pixel rectangle. If the black pixel rectangle is the last one, the preferred process proceeds to a step 211 for outputting the results and terminates. On the other hand, when any none of the conditions 1-1) through 1-4) is met, the first determination result becomes OK. The black pixel rectangle in question now becomes a parent rectangle and a frame candidate in a step 204. In a step 205, the white pixel rectangle extraction unit 105 extracts a white pixel rectangle from an inner area of the parent rectangle or corresponding document image data in the image memory unit 102 based upon the area information of the black pixel rectangle. The white pixel rectangle is a circumscribing rectangle for continuous portions of white pixels. The area information of the white pixel rectangle such as upper left corner coordinates and lower right corner coordinates is also stored in the working memory unit 107 in the step 205.

Still referring to FIG. 5, the second determination unit 106 retrieves the area information from the working memory unit 107 for the white pixel rectangle in a step 206 and determines for the second time whether or not the corresponding parent rectangle is a frame or non-frame based upon a second set of conditions in a step 207. The detailed steps of the second determination will be described later. When the second determination results in that the parent rectangle is indeed a frame in a step 207, the second determination result is set to OK also in the step 207. For example, in the step 208, a flag in the corresponding area information is now set to indicate that the rectangle is a frame. Alternatively, similar information is stored in a frame information area in the working memory unit 107. On the other hand, when the second determination results in that the parent rectangle is not a frame in a step 207, the second determination result is set to NG. If there is any white pixel rectangle as determined in a step 209, the preferred process proceeds to the step 206. The second determination unit 106 retrieves the area information from the working memory unit 107 for another white pixel rectangle in the step 206 and determines for the second time whether or not the corresponding parent rectangle is a frame or non-frame based upon a second set of conditions in the step 207. On the other hand, if there is not any white pixel rectangle as determined in a step 209, the preferred process proceeds to the step 210 to determine whether or not any black pixel rectangle remains unprocessed. When every black pixel is processed, the preferred process proceeds to the step 211 for outputting the results to an external unit such as a character recognition unit.

Now referring to FIG. 6, the above step 207 will be described in a flow chart illustrating steps involved in a first preferred process of the second determination process according to the current invention. In general, the second determination is based upon a positional relationship between the parent rectangle and the white pixel rectangle that is extracted from an inner area of the parent rectangle.

In a step 300, the center of a parent rectangle and that of the corresponding white pixel rectangle are each determined. In a step 301, a difference between the above determined centers is calculated in pixels. The above center difference is compared to a predetermined threshold value th1 whose exemplary value is 4 in a step 302. If the difference is equal to or below the predetermined threshold value, the second determination result become OK in a step 303. On the other hand, if the difference is above the predetermined threshold value, the second determination result becomes NG (no good) in a step 304.

Figure 6:
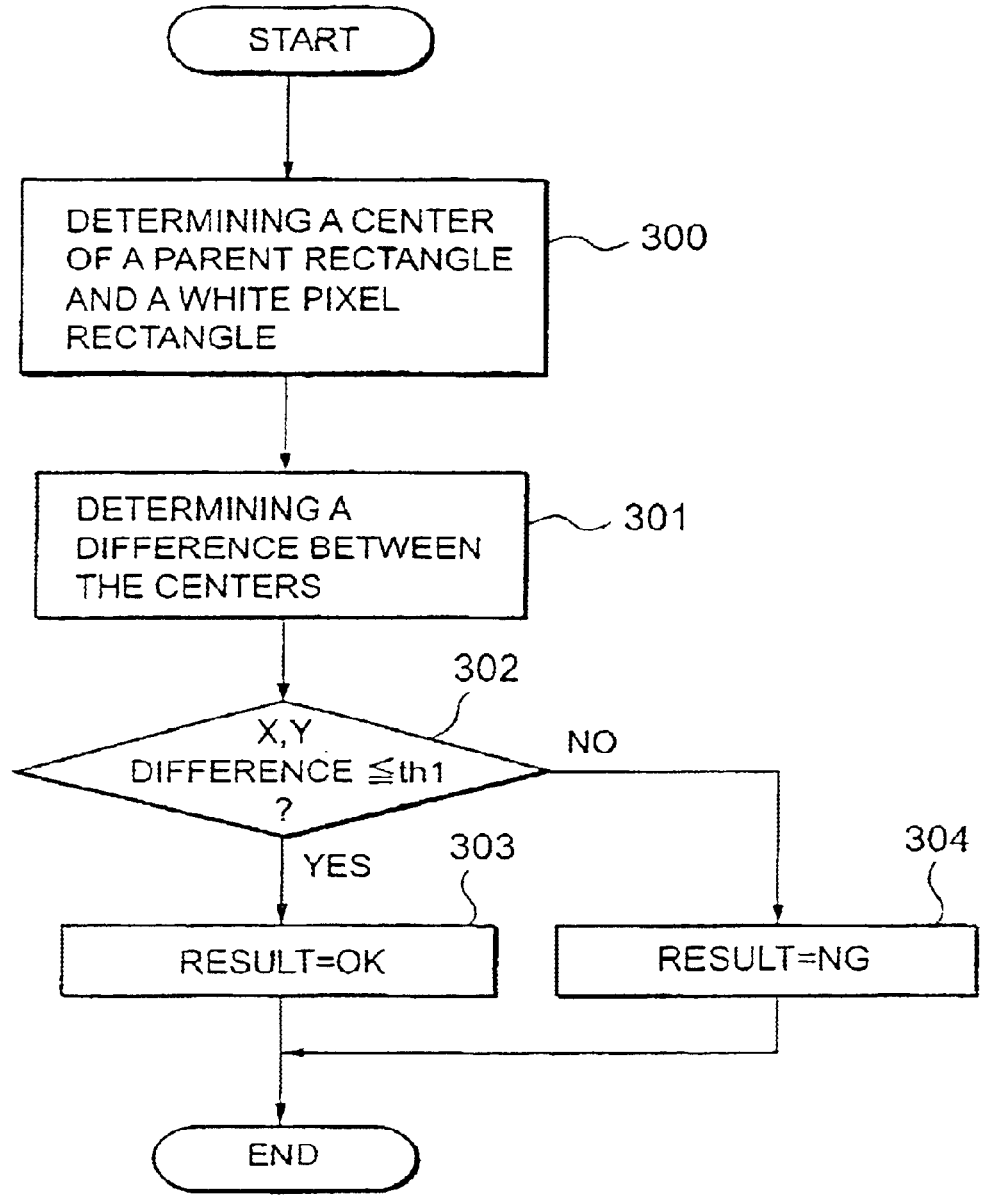
FIG. 6 is a flow chart illustrating steps involved in a first preferred process of the second determination process according to the current invention.

Still referring to FIG. 6, the above second determination process is illustrated by a numerical example. For example, a parent rectangle has the upper left corner coordinates (Xso, Yso) and the lower right corner coordinates (Xeo, Yeo) where Xso=365, Yso=840; Xeo=400, Yeo=905. Similarly, an extracted white pixel rectangle has the upper left corner coordinates (Xsw, Ysw) and the lower right corner coordinates (Xew, Yew) where Xsw=372, Ysw=850; Xew=392, Yew=898. Based upon the above exemplary numbers, the center of the parent rectangle is at the coordinate (383, 873) while that of the white pixel rectangle is (382, 874). Thus, the difference between these centers is 1 (one) in both the X and Y directions. Since the difference is below the predetermined value of 4 pixels, the condition is met for the parent rectangle to be determined as a frame.

Figure 7:
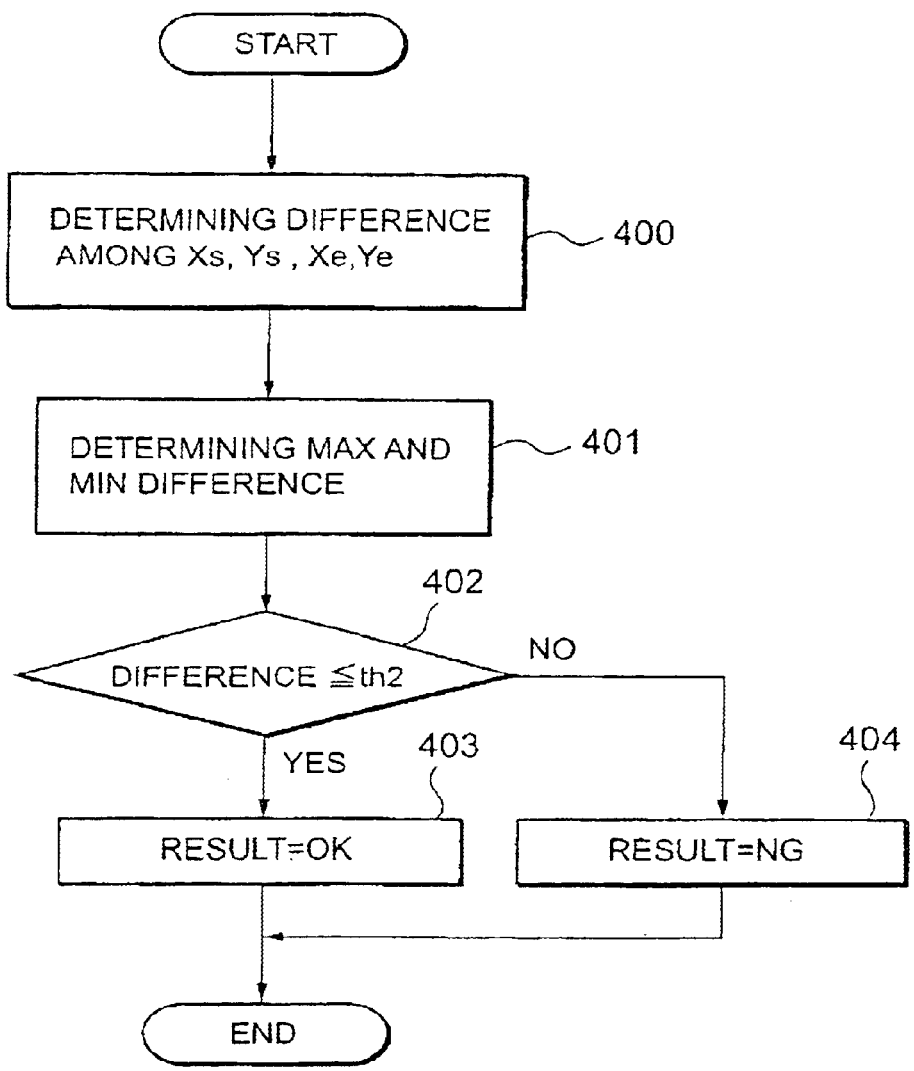
FIG. 7 is a flow chart illustrating steps involved in a second preferred process of the second determination process according to the current invention.

Now referring to FIG. 7, a flow chart illustrates steps involved in a second preferred process of the second determination process according to the current invention. Differences in coordinate between the parent rectangle and the corresponding white pixel rectangle are denoted by Xs, Ys, Xe and Ye and are determined in a step 400. Based upon the above example with respect to FIG. 6, the pixel value difference Xs is in pixels and between Xso and Xsw or Xs (Xso, Xsw). Similarly, other pixel value differences include Ys (Yso,Ysw); Xe (Xeo, Xew); and Ye (Yeo, Yew). Among the above determined differences Xs, Ys, Xe and Ye, a max value and a minimal value are determined, and the max-min difference between the max value and the minimal value is determined in a step 401. The max-min difference is compared to a second predetermined threshold value such as 2 in a step 402. If the max-min difference is equal to or below the second predetermined threshold value, the second determination result become OK in a step 403. On the other hand, if the difference is above the second predetermined threshold value, the second determination result becomes NG (no good) in a step 404. For example, if the differences Xs, Ys, Xe and Ye each have 7, 10, 8 and 7, the max-min difference is 10−7 or 3. Assuming the second predetermined threshold value is 5 pixels, since the max-min difference 3 is below the second predetermined threshold value, the parent rectangle is determined as a frame.

Figure 8:
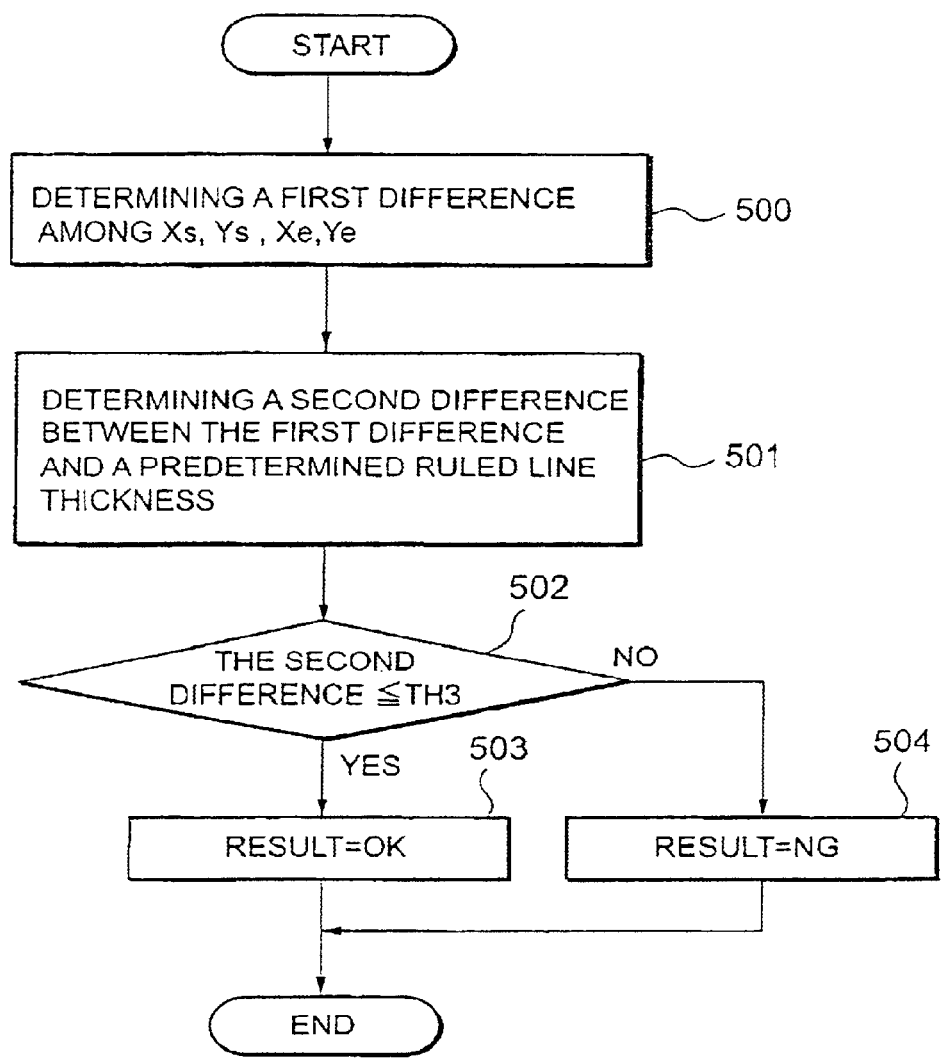
FIG. 8 is a flow chart illustrating steps involved in a third preferred process of the second determination process according to the current invention.

Now referring to FIG. 8, a flow chart illustrates steps involved in a third preferred process of the second determination process according to the current invention. Differences in coordinate between the parent rectangle and the corresponding white pixel rectangle are denoted by Xs, Ys, Xe and Ye and are determined in a step 500. Based upon the above example with respect to FIG. 6, the pixel value difference Xs is in pixels and between Xso and Xsw or Xs (Xso, Xsw). Similarly, other differences include Ys (Yso, Ysw); Xe (Xeo, Xew); and Ye (Yeo, Yew). In a step 501, the difference between each of the above determined differences Xs, Ys, Xe and Ye and a predetermined ruled line thickness such as 9 pixels is determined, and this ruled line difference is also defined as a second difference. Furthermore, each of the second differences is compared to a third predetermined threshold value th3 such as four pixels in a step 502. If any of the second differences is larger than the third predetermined threshold value in the step 502, the result is set to NG in a step 504. On the other hand, all of the second differences are equal to or smaller than the third predetermined threshold value in the step 502, the result is set to OK in a step 503. By using the example given in the first preferred embodiment, the differences are as follows Xs=7, Ys=10, Xe=8, Ye=7. Since the predetermined ruled line thickness is 9 pixels in the above example with respect to the third preferred embodiment, a maximal value of the second difference is 2. Under the above example, the result gets OK to indicate that the corresponding parent rectangle is a frame.

Figure 9:
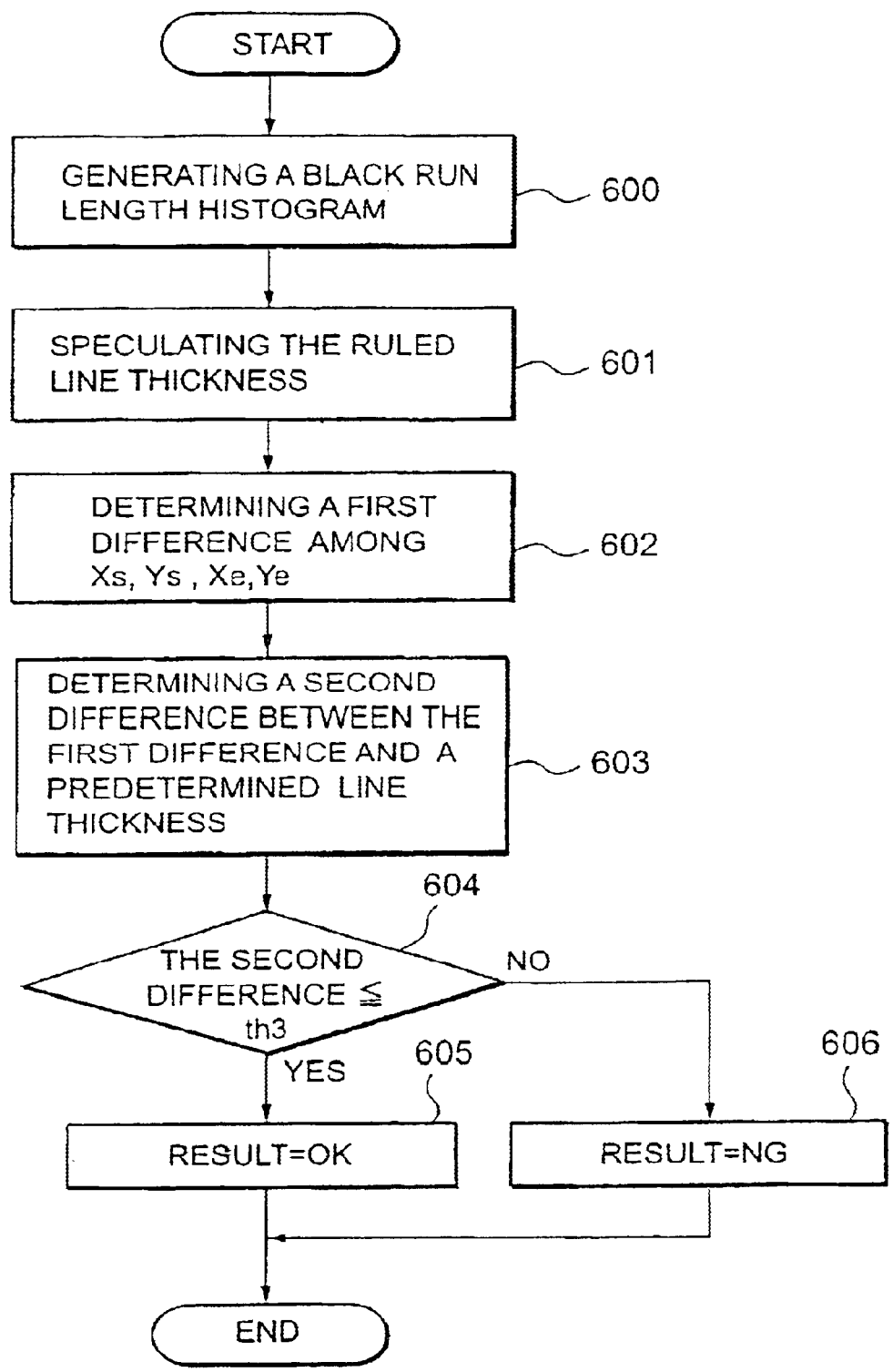
FIG. 9 is a flow chart illustrating steps involved in a fourth preferred process of the second determination process according to the current invention.

Referring to FIG. 9, a flow chart illustrates steps involved in a fourth preferred process of the second determination process according to the current invention. Within a parent rectangle, horizontal or vertical contiguous black pixel runs are extracted, and a histogram is generated for the length of the extracted black pixel runs in a step 600. A parent rectangle is assumed to be internally devoid of black pixels since the filled rectangles are excluded in the first determination. Based upon the above assumption, the median value in the above constructed histogram is considered as the thickness of ruled lines used in the frame in a step 601. Based upon the above example with respect to FIG. 6, the difference Xs is in pixels and between a parent rectangle Xso and a corresponding white rectangle Xsw or Xs (Xso, Xsw). Similarly, other differences include Ys (Yso,Ysw); Xe (Xeo, Xew); and Ye (Yeo, Yew). First differences or pixel value differences Xs, Ys, Xe and Ye are determined in a step 602. In a step 603, the difference between each of the above determined first differences Xs, Ys, Xe and Ye and a predetermined ruled line thickness is determined, and this ruled line difference is defined as a second difference. Furthermore, each of the second differences is compared to a third predetermined threshold value th3 such as four pixels in a step 604. If any of the second differences is larger than the third predetermined threshold value in the step 604, the result is set to NG in a step 606. On the other hand, all of the second differences are equal to or smaller than the third predetermined threshold value in the step 604, the result is set to OK in a step 605.

In summary, the above described first through fourth preferred embodiments of the second determination process substantially improve in recognizing frames that are approximately the same size as or smaller than the corresponding text character size. The fourth preferred embodiment of the second determination process enables to substantially improve the detection of frames of different ruled line thickness. Incidentally, when any of the ruled lines in the frame is broken in the parent rectangle frame, the parent rectangle and the corresponding white pixel rectangle undesirably overlap with each other. Based upon the example used in the first preferred embodiment of the second determination process, assuming that a left side ruled line is broken in a parent rectangle, the extracted coordinates of the white pixel rectangle are Xsw=365, Ysw=850, Xew=392 and Yew=898. Consequently, the result of the second determination in the above first through fourth preferred embodiments would be NG, indicating that a parent rectangle is not a frame.

Figure 10:
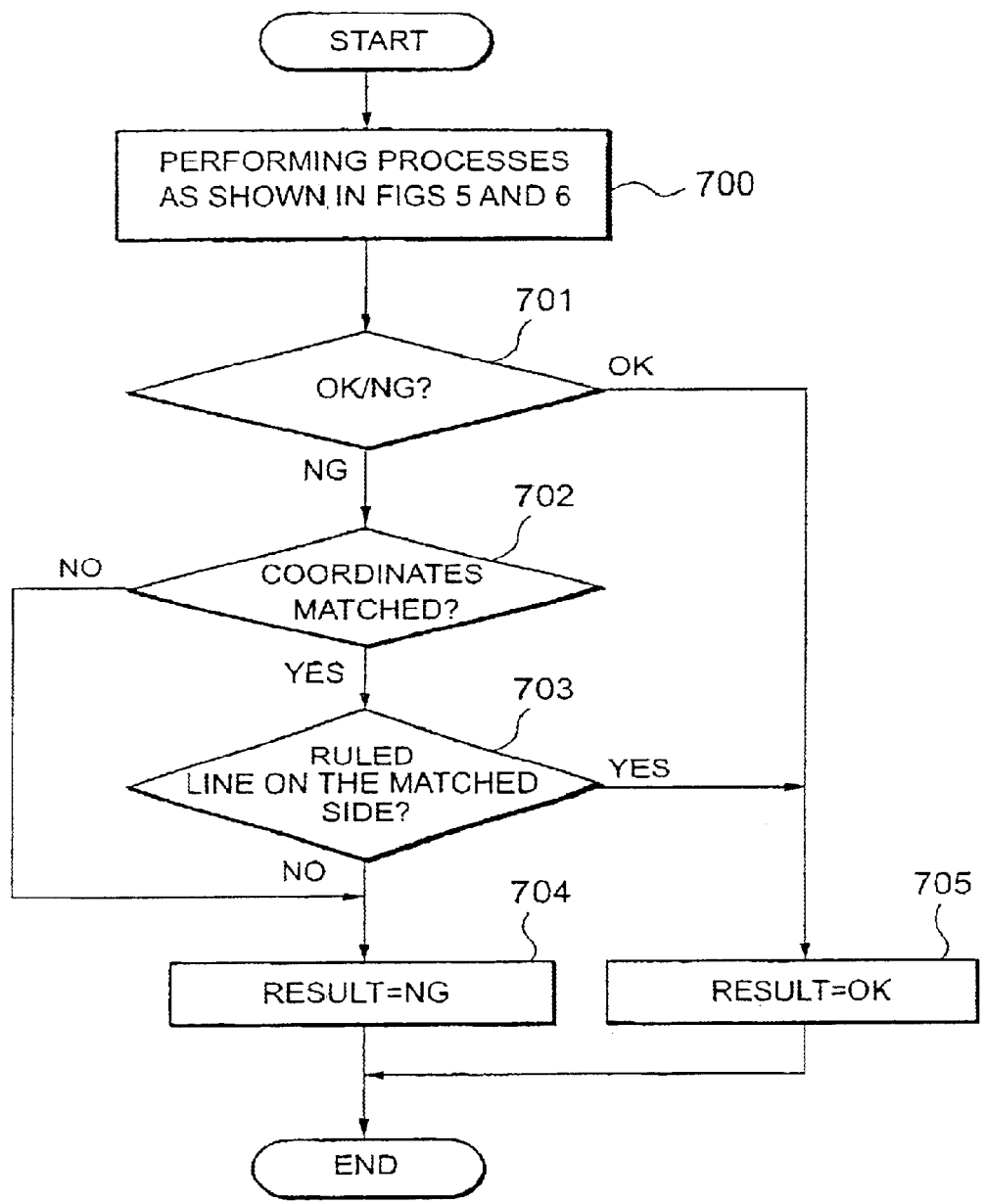
FIG. 10 is a flow chart illustrating steps involved in a fifth preferred process of the second determination process according to the current invention.

Now referring to FIG. 10, a flow chart illustrates steps involved in a fifth preferred process of the second determination process according to the current invention. In a step 700, the results of the second determination process are obtained as already described with respect to FIGS. 8 or 9.

Based upon the results, if the result is OK in a step 701, the fifth preferred process terminates by reassigning OK to the final result in a step 705. On the other hand, if the result is NG in the step 701, the fifth preferred process checks in a step 702 whether or not there is a match among the differences Xs, Ys, Xe and Ye each of which is a difference in coordinates between the parent rectangle and its corresponding white pixel rectangle. If there is no match in the step 702, the final result is assigned NG to indicate that the parent rectangle is not a frame in a step 704. On the other hand, there is a match in the step 702, it is determined whether or not a corresponding ruled line exists in a step 703. For example, if Xs matches, since the break in the ruled line is assumed to be on the left sideline in the parent rectangle, it is determined whether or not the left side ruled line exists in the step 703. One example of the determination on the existence of a ruled line is to cont a number of black pixels and to compare the counted number of the black pixels to a predetermined threshold value. If the count exceeds the predetermined threshold value, the ruled line is assumed to exist for the considered side of the parent rectangle. Based upon the step 703, if the ruled line exists, the final result is assigned OK in the step 705. On the other hand, if the ruled line does not exist, the final result is assigned NG in the step 704. The fifth preferred process of the second determination process also substantially improves in distinguishing certain Japanese characters that resemble the characteristics of the frame. For example, the black pixel rectangles of Japanese characters such as "L" or "L" appear to miss a left sideline or top and right side lines from a black pixel rectangle. The fifth preferred process of the second determination process correctly distinguishes the above otherwise confusing character images from the above described broken sidelines.

Figure 11:
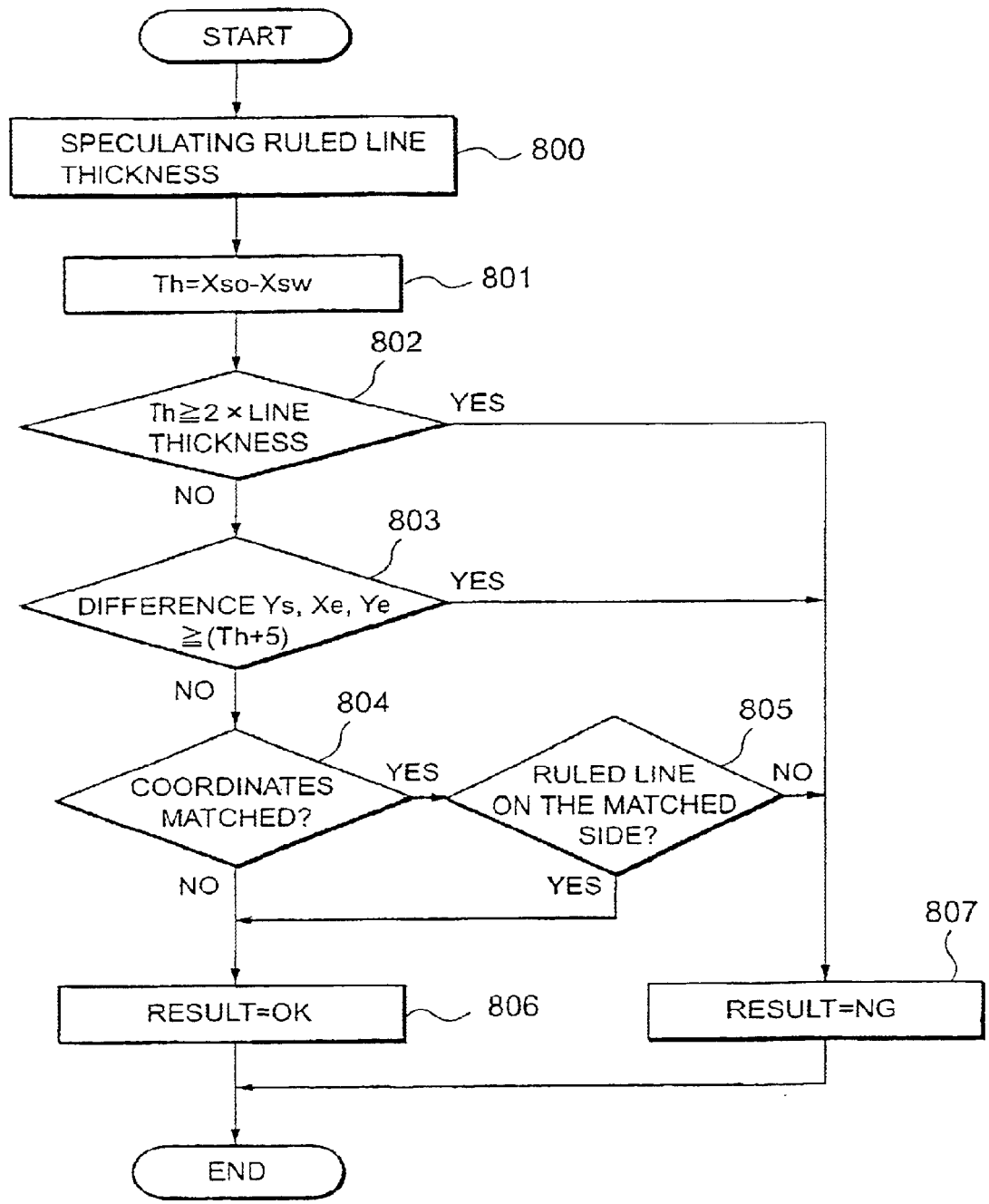
FIG. 11 is a flow chart illustrating steps involved in a sixth preferred process of the second determination process according to the current invention.

Now referring to FIG. 11, a flow chart illustrates steps involved in a sixth preferred process of the second determination process according to the current invention. The sixth preferred process also substantially improves the correct detection of frames with a broken sideline. In a step 800, the ruled line thickness is speculated as already described in the steps 600 and 601 with respect to FIG. 9. A horizontal or vertical contiguous black pixel runs are extracted to generate a histogram for the length of the extracted black pixel runs. Based upon the histogram, the median value is considered as the thickness of ruled lines used in a frame. In a step 801, the difference Xs between Xso and Xsw is determined, and the difference is assigned as a standard threshold value Th. In a step 802, it is determined whether or not the standard threshold value Th is equal to or larger than twice the ruled line thickness. If it is determined that the standard threshold value Th is equal to or larger than twice the ruled line thickness in the step 802, the sixth preferred process assigns the final result to be NG which indicates a non-frame for the parent rectangle in a step 807. On the other hand, if it is determined that the standard threshold value Th is smaller than twice the ruled line thickness in the step 802, the sixth preferred process determines the other differences Ys, Xe and Ye and also determines whether or not any one of them is equal to or larger than (the standard threshold value Th+5) in a step 803. Again, if any one of the differences Ys, Xe and Ye is equal to or larger than (the standard threshold value Th+5) in a step 803, the final result is assigned NG in a step 807. On the other hand, any of the differences Ys, Xe and Ye is smaller than (the standard threshold value Th+5) in the step 803, it is determined whether or not coordinates between the parent rectangle and its white pixel rectangle match in a step 804. If no match is confirmed in the step 804, the final result is assigned OK, indicating that the parent rectangle is a frame in a step 806. When there is a coordinate match in the step 804, it is further determined whether or not a ruled line exists for the matched sideline in a step 805. If a ruled line exists as determined in the step 805, the final result is assigned OK. However, if no ruled line exists in the step 805, the final result is assigned NG in a step 807.

The above described preferred embodiments of the frame recognition system and process are implemented in a software program for a general computer, and the software implementation is within the spirit of the current invention. Further more, any storage medium for storing the above software program is also within the scope of the current invention, and these storage media include magnetic disks, optical disks, optomagnetic disks and semiconductor memory chips from which the software program is read by a computer possibly via a network.

Figure 12:
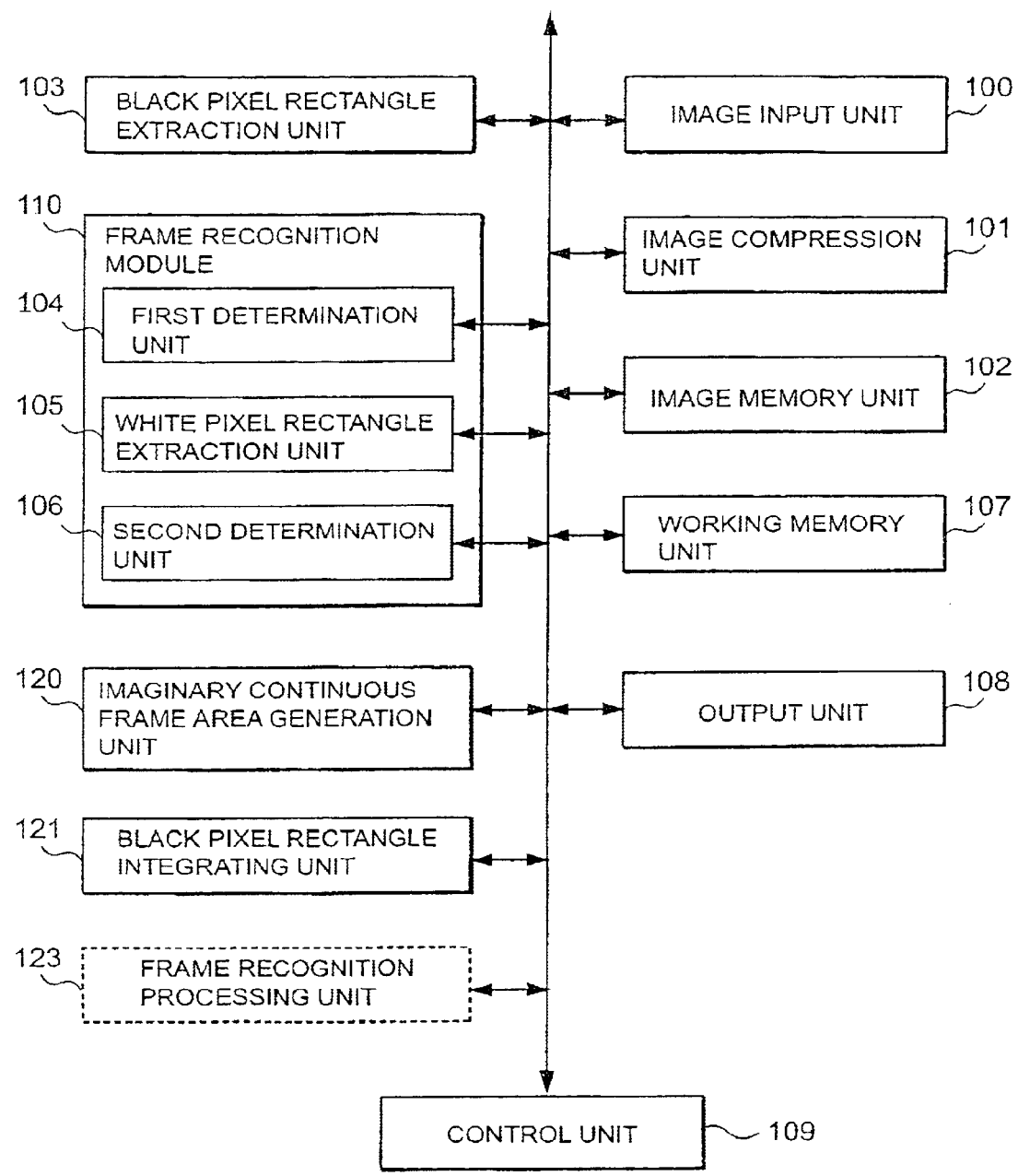
FIG. 12 is a block diagram illustrating a second preferred embodiment of the frame recognition device according to the current invention.

Now referring to FIG. 12, a block diagram illustrates a second preferred embodiment of the frame recognition device according to the current invention. Certain components of the second preferred embodiment of the frame recognition device are substantially identical to those of the first preferred embodiment, and these substantially identical components are referred by the same reference numerals as used in FIG. 4. The second preferred embodiment of the frame recognition device includes an image input unit 100, an image compression unit 101, an image memory unit 102, a black pixel rectangle extraction unit 103, a working memory unit 107, an output unit 108, a control unit 109 and a frame recognition module 110. The frame recognition module 110 further includes a first determination unit 104, a white pixel rectangle extraction unit 105 and a second determination unit 106. The image compression unit 101 is optionally excluded from the frame recognition device.

Still referring to FIG. 12, the second preferred embodiment of the frame recognition device further includes an imaginary continuous frame area generation unit 120, a black pixel rectangle integration unit 121 and a frame recognition process unit 123. Conceptually speaking, the second preferred embodiment includes the black pixel rectangle integration unit 121 for integrating black pixel rectangles and the frame recognition process unit 123. However, in actuality, since the frame recognition module 110 may be also used for the frame recognition, the frame recognition process unit 123 is not separately implemented. When the frame recognition module 110 is implemented for use in place of the separate frame recognition process unit 123, the cost reduction is realized in manufacturing of the frame recognition device. Also in the software implementation, the frame recognition module 110 is used for the frame recognition process, the program size is reduced, and the run-time memory requirement may be reduced. Contrarily to the above considerations, when a separate frame recognition process unit 123 is implemented, if different algorithms are used in the separate frame recognition process unit 123, the recognition device as a whole has more flexibility and intelligence in recognizing frames. In addition, the second preferred embodiment of the frame recognition device according to the current invention may be combined with a prior art frame recognition device by providing an output interface for the output from the prior art device to the device of the current invention.

Figure 13:
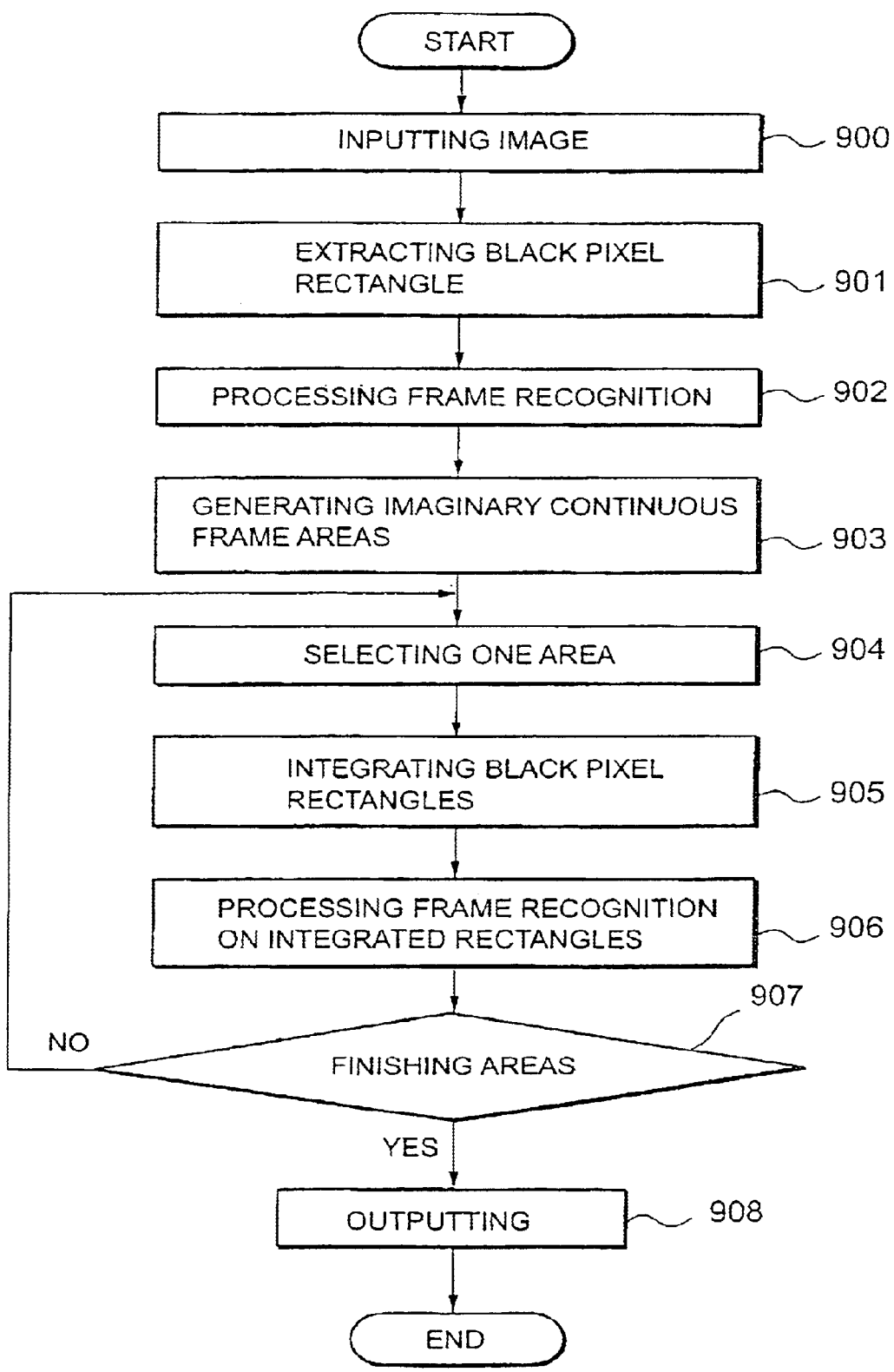
FIG. 13 is a flow chart illustrating steps involved in an overall preferred process of the frame according to the current invention.

Now referring to FIG. 13, a flow chart illustrates steps involved in an overall preferred process of the frame according to the current invention. Since the overall preferred process is performed by the second preferred embodiment of the frame recognition device, components of the second preferred embodiments are referred with respect to the steps as illustrated in FIG. 12. In a step 200, the image input unit 100 inputs document image data in digital format, and the inputted image data is stored in a step 900. Depending upon necessity, the image compression unit 101 compresses the image data. The black pixel rectangle extraction unit 103 extracts a black pixel rectangle from the document image data in the image memory unit 102 in a step 901. The black pixel rectangle extraction is optionally limited to a certain predetermined portion of the document image. The area information for an extracted black pixel rectangle includes coordinates of corners such as an upper left and a lower right, and the area information is stored in the working memory unit 107. After the black pixel rectangle extraction, the frame recognition module 110 performs the frame recognition in a step 902. The detailed steps of the frame recognition are described with respect to the steps 202 through 210 with respect to FIG. 5.

Still referring to FIG. 13, steps 903 through 908 reattempt to recognize frames that have not been recognized as a frame based upon the same information used in the step 902. One of the reasons for being unrecognized as a frame is a broken sideline in a parental rectangle. In general, since a frame arrangement has continuity or repetition, it is relatively simple to speculate a black pixel rectangle as a frame based upon the position of an already recognized black pixel rectangle. In a step 903, the imaginary continuous frame area generation unit 120 generates an assumed repeated frame area based upon an already recognized black pixel rectangle. Although a single frame may exist by itself, frames generally exist in a group. For example, one row of frames includes separate frames for an account number, a telephone number, a name and an address. Moreover, the row of frames is generally in the same size. In particular, in certain documents such as a checklist, frames are precisely arranged in a matrix. Since most of these checklists are organized in the horizontal direction, frames are also likely to be arranged in the x direction. Among the recognized black pixel rectangles that are recognized as frames, black pixel rectangles that are arranged in the Y direction are integrated in the X direction, and the integrated black pixel rectangles are expanded to the entire width of the document or to the specified width so as to generate the assumed repeated frame area.

After the generation of the assumed repeated frame areas, one of the assumed repeated frame areas is selected in a step 904. In a step 905, the black pixel rectangle integration unit 121 integrates from the assumed repeated frame area a highly likely black pixel rectangle that has been considered as a frame candidate but not as a frame. The frame recognition module 110 performs a predetermined frame recognition process on the integrated black pixel rectangle in a step 906. The above described enables to recognize certain frames that are not necessarily recognized due to two broken sidelines by the process performed by the first preferred embodiment of the frame recognition device. After one repeated frame area is processed, the preferred process returns to the step 904 for repeating the steps 905 and 906 as it is determined that a repeated frame area is left in a step 907. On the other hand, if it is determined that a repeated frame area is not left in a step 907, the output unit 108 outputs the information on all of the recognized frames in a step 908, and the preferred process terminates. When a separate frame recognition unit 123 is implemented in addition to the frame recognition module, the step 906 is performed by the frame recognition unit 123. As disclosed in Japanese Patent Laid Publication 11-66225, if a break is identified in ruled lines in the integrated black pixel rectangle, the broken ruled lines are patched. If the patched ruled lines form a rectangle, the black pixel rectangle is recognized as a frame.

Figure 14:
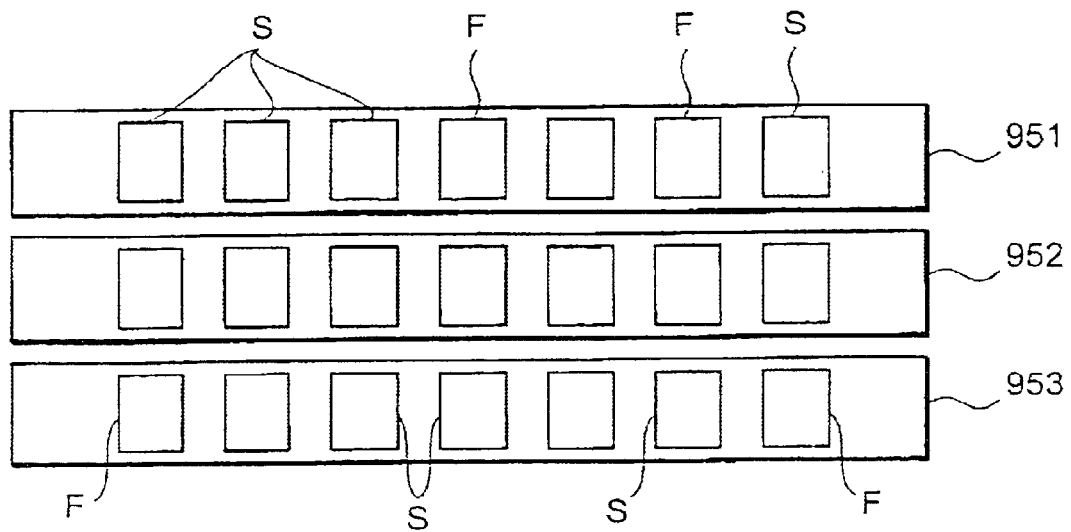
FIG. 14 illustrates exemplary assumed repeated frame areas.

Now referring to FIG. 14, rectangles 951, 952 and 953 represent exemplary assumed repeated frame areas. Within the assumed repeated frame areas 951, 952 and 953, individual black pixel rectangles as referred by S is satisfactorily recognized as a frame while those rectangles as referred by F is unsatisfactorily recognized as a frame. The reason for extending the assumed repeated frame areas 951, 952 and 953 to the fullest width is that the failed frames exist outside of the successfully recognized frames as seen in the assumed repeated frame area 953. Incidentally, in certain formats, the frames are arranged in a vertical direction. For the processing of these formats, the assumed repeated frame areas are extended in the vertical direction to integrate the frame candidates. The imaginary continuous frame area generation unit 120 automatically determines the direction of the integration of the frames and generates the assumed repeated frame areas. Furthermore, the imaginary continuous frame area generation unit 120 categorizes the recognized frames based upon size and integrate the frames of the same size to generate an assumed repeated frame area.

Figure 15:
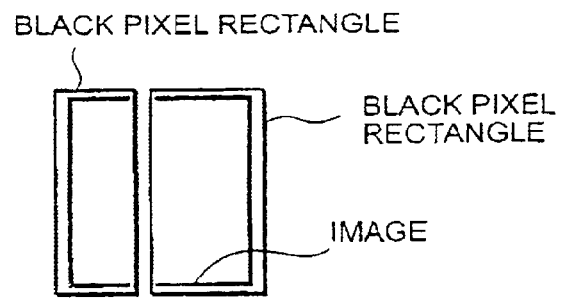
FIG. 15 illustrates an example in which there is no overlapping black pixel rectangle in a horizontal direction.

FIG. 15 illustrates an example in which there is no overlapping black pixel rectangle in a horizontal direction. However, these black pixel rectangles are close with each other in distance in the horizontal direction, and there is little difference in height. In these case, these black pixel rectangles are integrated when an assumed repeated frame area is generated.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of recognizing a frame in a document image, comprising:
   inputting document image data;
   extracting a black pixel rectangle that circumscribes continuous black pixels, the black pixel rectangle defining a parent rectangle;
   determining whether or not the parent rectangle is a frame candidate based upon a predetermined set of first criteria;
   extracting a white pixel rectangle that circumscribes continuous white pixels within the parent rectangle of the frame candidate; and
   further determining whether or not the frame candidate is a frame based upon a predetermined set of second criteria, the second criteria including at least a comparison of a certain aspect between the white pixel rectangle and the black pixel rectangle.

2. The method of recognizing a frame in a document image according to claim 1 wherein the predetermined set of the first criteria includes a comparison of one side of the black pixel rectangle to a first predetermined threshold value.

3. The method of recognizing a frame in a document image according to claim 1 wherein the predetennined set of the first criteria includes a comparison of a ratio of sides of the black pixel rectangle to a second predetermined threshold value.

4. The method of recognizing a frame in a document image according to claim 1 wherein the predetermined set of the first criteria includes a comparison of a black pixel density of the black pixel rectangle to a third predetermined threshold value.

5. The method of recognizing a frame in a document image according to claim 1 wherein the predetermined set of the second criteria includes additional steps of:
   comparing a center difference in center position between the white pixel rectangle and the black pixel rectangle to a fourth predetermined threshold value; and
   recognizing the frame candidate as a frame if the center difference is equal to or smaller than the fourth predetermined threshold value.

6. The method of recognizing a frame in a document image according to claim 1 wherein the predetermined set of the second criteria includes additional steps of:
   determining a pixel value difference in coordinates of each of corresponding four corners between the white pixel rectangle and the black pixel rectangle;
   further determining a max-to-min difference between a maximal value of the pixel value differences and a minimal value of the pixel value differences;
   comparing the max-to-min difference to a fifth predetermined threshold value; and
   recognizing the frame candidate as a frame if the max-to-min difference is equal to or smaller than the fifth predetermined threshold value.

7. The method of recognizing a frame in a document image according to claim 1 wherein the predetermined set of the second criteria includes additional steps of:
   determining a pixel value difference in coordinates of each of corresponding four corners between the white pixel rectangle and the black pixel rectangle;
   further determining a ruled line difference between each of the pixel value differences and a predetermined ruled line thickness;
   comparing the ruled line difference to a sixth predetermined threshold value; and
   recognizing the frame candidate as a frame if the ruled line difference is equal to or smaller than the sixth predetermined threshold value.

8. The method of recognizing a frame in a document image according to claim 7 wherein the predetermined set of the second criteria includes additional steps of:
   determining whether or not any one of the pixel value differences is zero if the ruled line difference is larger than the sixth predetermined threshold value, a matched side being defined as a side for the pixel value difference being zero;
   determining whether or not a ruled line exists on the matched side if the pixel value difference is zero; and
   recognizing the frame candidate as a frame if the ruled line exists on the matched side.

9. The method of recognizing a frame in a document image according to claim 1 wherein the predetermined set of the second criteria includes additional steps of:
   generating a histograms of the length of the continuous black pixels;
   assuming a width of a ruled line based upon a median value in the histogram;
   determining a pixel value difference in coordinates of each of corresponding four corners between the white pixel rectangle and the black pixel rectangle;
   determining a line thickness difference between the pixel value difference and the assumed width of the ruled line;
   comparing the line thickness difference to a seventh predetermined threshold value; and
   recognizing the frame candidate as a frame if the line thickness difference is equal to or smaller than the seventh predetermined threshold value.

10. The method of recognizing a frame in a document image according to claim 9 wherein the predetermined set of the second criteria includes additional steps of:
    determining whether or not any one of the pixel value differences is zero if the ruled line difference is larger than the sixth predetermined threshold value, a matched side being defined as a side for the pixel value difference being zero;
    determining whether or not a ruled line exists on the matched side if the pixel value difference is zero; and
    recognizing the frame candidate as a frame if the ruled line exists on the matched side.

11. The method of recognizing a frame in a document image according to claim 1 wherein the predetermined set of the second criteria includes additional steps of:
    generating a histograms of the length of the continuous black pixels;
    assuming a width of a ruled line based upon a median value in the histogram;
    determining a pixel value difference in coordinates of each of corresponding four corners between the white pixel rectangle and the black pixel rectangle, the pixel value difference being defined as an eight threshold value;
    comparing a double width that is twice the width of the ruled line to the eight threshold value;
    comparing the pixel value difference to eight threshold value plus five if the eight threshold value is smaller than the double width;
    determining whether or not any one of the pixel value differences is zero if the pixel value difference is smaller than the eight threshold value plus five, a matched side being defined as a side for the pixel value difference being zero;
    determining whether or not a ruled line exists on the matched side if the pixel value difference is smaller than eight threshold value plus five; and
    recognizing the frame candidate as a frame if the ruled line exists on the matched side.

12. The method of recognizing a frame in a document image according to claim 1 wherein the predetermined set of the second criteria includes additional steps of:
    generating a histogram of the length of the continuous black pixels;
    assuming a width of a ruled line based upon a median value in the histogram;
    determining a pixel value difference in coordinates of each of corresponding four corners between the white pixel rectangle and the black pixel rectangle, the pixel value difference being defined as an eight threshold value;
    comparing a double width that is twice the width of the ruled line to the eight threshold value;

comparing the pixel value difference to eight threshold value plus five if the eight threshold value is smaller than the double width;

determining whether or not any one of the pixel value differences is zero if the pixel value difference is smaller than the eight threshold value plus five; and recognizing the frame candidate as a frame if any one of the pixel value differences is not zero.

13. The method of recognizing a frame in a document image according to claim 1 further comprising:

integrating into a single area the frames as determined by the first and second criteria and the frame candidates as determined by the first criteria but not by the second criteria based upon a common orientation of the frames and the frame candidates;

selecting one of the frame candidates at a time; and determining whether or not the selected one of the frame candidates is a frame based upon a predetermined set of third criteria.

14. A computer readable medium storing a computer program for recognizing a frame in a document image, the computer program providing computer instructions to perform the following steps of:

inputting document image data;

extracting a black pixel rectangle that circumscribes continuous black pixels, the black pixel rectangle defining a parent rectangle;

determining whether or not the parent rectangle is a frame candidate based upon a predetermined set of first criteria;

extracting a white pixel rectangle that circumscribes continuous white pixels within the parent rectangle of the frame candidate; and further determining whether or not the frame candidate is a frame based upon a predetermined set of second criteria, the second criteria including at least a comparison of a certain aspect between the white pixel rectangle and the black pixel rectangle.

15. A system for recognizing a frame in a document image, comprising:

an input device for inputting document image data;

a black pixel rectangle extraction device connected to said input device for extracting a black pixel rectangle that circumscribes continuous black pixels, the black pixel rectangle defining a parent rectangle;

a first determination device connected to said black pixel rectangle extraction device for determining whether or not the parent rectangle is a frame candidate based upon a predetermined set of first criteria;

a white pixel rectangle extraction device connected to said first determination device for extracting a white pixel rectangle that circumscribes continuous white pixels within the parent rectangle of the frame candidate; and a second determination device connected to said black pixel rectangle extraction device and said white pixel rectangle extraction device for further determining whether or not the frame candidate is a frame based upon a predetermined set of second criteria, the second criteria including at least a comparison of a certain aspect between the white pixel rectangle and the black pixel rectangle.

16. The system for recognizing a frame in a document image according to claim 15 wherein said first determination device compares one side of the black pixel rectangle to a first predetermined threshold value.

17. The system for recognizing a frame in a document image according to claim 15 wherein said first determination device compares a ratio of sides of the black pixel rectangle to a second predetermined threshold value.

18. The system for recognizing a frame in a document image according to claim 15 wherein said first determination device compares a black pixel density of the black pixel rectangle to a third predetermined threshold value.

19. The system for recognizing a frame in a document image according to claim 15 wherein said second determination device compares a center difference in center position between the white pixel rectangle and the black pixel rectangle to a fourth predetermined threshold value recognizes the frame candidate as a frame if the center difference is equal to or smaller than the fourth predetermined threshold value.

20. The system for recognizing a frame in a document image according to claim 15 wherein said second determination device determines a pixel value difference in coordinates of each of corresponding four corners between the white pixel rectangle and the black pixel rectangle, said second determination device further determining a max-to-min difference between a maximal value of the pixel value differences and a minimal value of the pixel value differences, said second determination device comparing the max-to-min difference to a fifth predetermined threshold value, and said second determination device recognizing the frame candidate as a frame if the max-to-min difference is equal to or smaller than the fifth predetermined threshold value.

21. The system for recognizing a frame in a document image according to claim 15 wherein said second determination device determines a pixel value difference in coordinates of each of corresponding four corners between the white pixel rectangle and the black pixel rectangle, said second determination device further determining a ruled line difference between each of the pixel value differences and a predetermined ruled line thickness, said second determination device comparing the ruled line difference to a sixth predetermined threshold value, and said second determination device recognizing the frame candidate as a frame if the ruled line difference is equal to or smaller than the sixth predetermined threshold value.

22. The system for recognizing a frame in a document image according to claim 21 wherein said second determination device further determines whether or not any one of the pixel value differences is zero if the ruled line difference is larger than the sixth predetermined threshold value, a matched side being defined as a side for the pixel value difference being zero, said second determination device determining whether or not a ruled line exists on the matched side if the pixel value difference is zero, and said second determination device recognizing the frame candidate as a frame if the ruled line exists on the matched side.

23. The system for recognizing a frame in a document image according to claim 15 wherein said second determination device generates a histogram of the length of the continuous black pixels, said second determination device assuming a width of a ruled line based upon a median value in the histogram, said second determination device determining a pixel value difference in coordinates of each of corresponding four corners between the white pixel rectangle and the black pixel rectangle, said second determination device further determining a line thickness difference between the pixel value difference and the assumed width of the ruled line, said second determination device comparing the line thickness difference to a seventh predetermined threshold value, and said second determination device recognizing the frame candidate as a frame if the line thickness difference is equal to or smaller than the seventh predetermined threshold value.

24. The system for recognizing a frame in a document image according to claim 23 wherein said second determination device determines whether or not any one of the pixel value differences is zero if the ruled line difference is larger than the sixth predetermined threshold value, a matched side being defined as a side for the pixel value difference being zero, said second determination device determining whether or not a ruled line exists on the matched side if the pixel value difference is zero, and said second determination device recognizing the frame candidate as a frame if the ruled line exists on the matched side.

25. The system for recognizing a frame in a document image according to claim 15 wherein said second determination device generates a histograms of the length of the continuous black pixels, said second determination device assuming a width of a ruled line based upon a median value in the histogram, said second determination device determining a pixel value difference in coordinates of each of corresponding four corners between the white pixel rectangle and the black pixel rectangle, the pixel value difference being defined as an eight threshold value, said second determination device comparing a double width that is twice the width of the ruled line to the eight threshold value, said second determination device comparing the pixel value difference to eight threshold value plus five if the eight threshold value is smaller than the double width, said second determination device determining whether or not any one of the pixel value differences is zero if the pixel value difference is smaller than the eight threshold value plus five, a matched side being defined as a side for the pixel value difference being zero, said second determination device determining whether or not a ruled line exists on the matched side if the pixel value difference is smaller than eight threshold value plus five, and said second determination device recognizing the frame candidate as a frame if the ruled line exists on the matched side.

26. The system for recognizing a frame in a document image according to claim 15 wherein said second determination device generates a histograms of the length of the continuous black pixels, said second determination device assuming a width of a ruled line based upon a median value in the histogram, said second determination device determining a pixel value difference in coordinates of each of corresponding four corners between the white pixel rectangle and the black pixel rectangle, the pixel value difference being defined as an eight threshold value, said second determination device comparing a double width that is twice the width of the ruled line to the eight threshold value, said second determination device comparing the pixel value difference to eight threshold value plus five if the eight threshold value is smaller than the double width, said second determination device determining whether or not any one of the pixel value differences is zero if the pixel value difference is smaller than the eight threshold value plus five, and said second determination device recognizing the frame candidate as a frame if any one of the pixel value differences is not zero.

27. The system for recognizing a frame in a document image according to claim 15 further comprising:
an imaginary continuous frame area generation device connected to said first determination device and said second determination device for integrating into a single area the frames as determined by the first and second criteria and the frame candidates as determined by the first criteria but not by the second criteria based upon a common orientation of the frames and the frame candidates; and
a frame recognition processing device connected to said imaginary continuous frame area generation device for selecting one of the frame candidates at a time and determining whether or not the selected one of the frame candidates is a frame based upon a predetermined set of third criteria.

28. A device for recognizing a frame in a document image, comprising:
an input unit for inputting document image data;
a black pixel rectangle extraction unit connected to said input unit for extracting a black pixel rectangle that circumscribes continuous black pixels, the black pixel rectangle defining a parent rectangle;
a first determination unit connected to said black pixel rectangle extraction unit for determining whether or not the parent rectangle is a frame candidate based upon a predetermined set of first criteria;
a white pixel rectangle extraction unit connected to said first determination unit for extracting a white pixel rectangle that circumscribes continuous white pixels within the parent rectangle of the frame candidate; and
a second determination unit connected to said black pixel rectangle extraction unit and said white pixel rectangle extraction unit for further determining whether or not the frame candidate is a frame based upon a predetermined set of second criteria, the second criteria including at least a comparison of a certain aspect between the white pixel rectangle and the black pixel rectangle.

29. The device for recognizing a frame in a document image according to claim 28 wherein said first determination unit compares one side of the black pixel rectangle to a first predetermined threshold value.

30. The device for recognizing a frame in a document image according to claim 28 wherein said first determination unit compares a ratio of sides of the black pixel rectangle to a second predetermined threshold value.

31. The device for recognizing a frame in a document image according to claim 28 wherein said first determination unit compares a black pixel density of the black pixel rectangle to a third predetermined threshold value.

32. The device for recognizing a frame in a document image according to claim 28 wherein said second determination unit compares a center difference in center position between the white pixel rectangle and the black pixel rectangle to a fourth predetermined threshold value recognizes the frame candidate as a frame if the center difference is equal to or smaller than the fourth predetermined threshold value.

33. The device for recognizing a frame in a document image according to claim 28 wherein said second determination unit determines a pixel value difference in coordinates of each of corresponding four corners between the white pixel rectangle and the black pixel rectangle, said second determination unit further determining a max-to-min difference between a maximal value of the pixel value differences and a minimal value of the pixel value differences, said second determination unit comparing the max-to-min difference to a fifth predetermined threshold value, and said second determination unit recognizing the frame candidate as a frame if the max-to-min difference is equal to or smaller than the fifth predetermined threshold value.

34. The device for recognizing a frame in a document image according to claim 28 wherein said second determination unit determines a pixel value difference in coordinates of each of corresponding four corners between the white pixel rectangle and the black pixel rectangle said second determination unit further determining a ruled line difference between each of the pixel value differences and a predetermined ruled line thickness, said second determination unit comparing the ruled line difference to a sixth predetermined threshold value, and said second determination unit recognizing the frame candidate as a frame if the ruled line difference is equal to or smaller than the sixth predetermined threshold value.

35. The device for recognizing a frame in a document image according to claim 34 wherein said second determination unit further determines whether or not any one of the pixel value differences is zero if the ruled line difference is larger than the sixth predetermined threshold value, a matched side being defined as a side for the pixel value difference being zero, said second determination unit determining whether or not a ruled line exists on the matched side if the pixel value difference is zero, and said second determination unit recognizing the frame candidate as a frame if the ruled line exists on the matched side.

36. The device for recognizing a frame in a document image according to claim 28 wherein said second determination unit generates a histogram of the length of the continuous black pixels, said second determination unit assuming a width of a ruled line based upon a median value in the histogram, said second determination unit determining a pixel value difference in coordinates of each of corresponding four corners between the white pixel rectangle and the black pixel rectangle, said second determination unit further determining a line thickness difference between the pixel value difference and the assumed width of the ruled line, said second determination unit comparing the line thickness difference to a seventh predetermined threshold value, and said second determination unit recognizing the frame candidate as a frame if the line thickness difference is equal to or smaller than the seventh predetermined threshold value.

37. The device for recognizing a frame in a document image according to claim 36 wherein said second determination unit determines whether or not any one of the pixel value differences is zero if the ruled line difference is larger than the sixth predetermined threshold value, a matched side being defined as a side for the pixel value difference being zero, said second determination unit determining whether or not a ruled line exists on the matched side if the pixel value difference is zero, and said second determination unit recognizing the frame candidate as a frame if the ruled line exists on the matched side.

38. The device for recognizing a frame in a document image according to claim 28 wherein said second determination unit generates a histograms of the length of the continuous black pixels, said second determination unit assuming a width of a ruled line based upon a median value in the histogram, said second determination unit determining a pixel value difference in coordinates of each of corresponding four corners between the white pixel rectangle and the black pixel rectangle, the pixel value difference being defined as an eight threshold value, said second determination unit comparing a double width that is twice the width of the ruled line to the eight threshold value, said second determination unit comparing the pixel value difference to eight threshold value plus five if the eight threshold value is smaller than the double width, said second determination unit determining whether or not any one of the pixel value differences is zero if the pixel value difference is smaller than the eight threshold value plus five, a matched side being defined as a side for the pixel value difference being zero, said second determination unit determining whether or not a ruled line exists on the matched side if the pixel value difference is smaller than eight threshold value plus five, and said second determination unit recognizing the frame candidate as a frame if the ruled line exists on the matched side.

39. The device for recognizing a frame in a document image according to claim 28 wherein said second determination unit generates a histograms of the length of the continuous black pixels, said second determination unit assuming a width of a ruled line based upon a median value in the histogram, said second determination unit determining a pixel value difference in coordinates of each of corresponding four corners between the white pixel rectangle and the black pixel rectangle, the pixel value difference being defined as an eight threshold value, said second determination unit comparing a double width that is twice the width of the ruled line to the eight threshold value, said second determination unit comparing the pixel value difference to eight threshold value plus five if the eight threshold value is smaller than the double width, said second determination unit determining whether or not any one of the pixel value differences is zero if the pixel value difference is smaller than the eight threshold value plus five and said second determination unit recognizing the frame candidate as a frame if any one of the pixel value differences is not zero.

40. The device for recognizing a frame in a document image according to claim 28 further comprising:
   an imaginary continuous frame area generation unit connected to said first determination unit and said second determination unit for integrating into a single area the frames as determined by the first and second criteria and the frame candidates as determined by the first criteria but not by the second criteria based upon a common orientation of the frames and the frame candidates; and
   a frame recognition processing unit connected to said imaginary continuous frame area generation unit for selecting one of the frame candidates at a time and determining whether or not the selected one of the frame candidates is a frame based upon a predetermined set of third criteria.

41. An apparatus for recognizing a frame in a document image, comprising:
   an input means for inputting document image data;
   a black pixel rectangle extraction means connected to said input means for extracting a black pixel rectangle that circumscribes continuous black pixels, the black pixel rectangle defining a parent rectangle;
   a first determination means connected to said black pixel rectangle extraction means for determining whether or not the parent rectangle is a frame candidate based upon a predetermined set of first criteria;
   a white pixel rectangle extraction means connected to said first determination means for extracting a white pixel rectangle that circumscribes continuous white pixels within the parent rectangle of the frame candidate; and
   a second determination means connected to said black pixel rectangle extraction means and said white pixel rectangle extraction means for further determining whether or not the frame candidate is a frame based upon a predetermined set of second criteria, the second criteria including at least a comparison of a certain aspect between the white pixel rectangle and the black pixel rectangle.

42. The apparatus for recognizing a frame in a document image according to claim 41 further comprising:

an imaginary continuous frame area generation means connected to said first determination means and said second determination means for integrating into a single area the frames as determined by the first and second criteria and the frame candidates as determined by the first criteria but not by the second criteria based upon a common orientation of the frames and the frame candidates; and a frame recognition processing means connected to said imaginary continuous frame area generation means for selecting one of the frame candidates at a time and determining whether or not the selected one of the frame candidates is a frame based upon a predetermined set of third criteria.

* * * * *